United States Patent
Sardinskas et al.

(10) Patent No.: US 9,709,172 B2
(45) Date of Patent: Jul. 18, 2017

(54) ROTOR SHAFT SEAL ASSEMBLY

(71) Applicant: Farrel Corporation, Ansonia, CT (US)

(72) Inventors: Stuart Sardinskas, Prospect, CT (US); Matthew Bonito, Prospect, CT (US)

(73) Assignee: Farrel Corporation, Ansonia, CT (US)

( * ) Notice: Subject to any disclaimer, the term of this patent is extended or adjusted under 35 U.S.C. 154(b) by 726 days.

(21) Appl. No.: 14/094,298

(22) Filed: Dec. 2, 2013

(65) Prior Publication Data
US 2015/0152966 A1    Jun. 4, 2015

(51) Int. Cl.
*F16J 15/18*    (2006.01)

(52) U.S. Cl.
CPC .............. *F16J 15/18* (2013.01); *F16J 15/182* (2013.01); *F16J 15/185* (2013.01)

(58) Field of Classification Search
CPC ........................................................ F16J 15/18
See application file for complete search history.

(56) References Cited

U.S. PATENT DOCUMENTS

| | | | | |
|---|---|---|---|---|
| 1,817,867 | A | * | 8/1931 | Bailey ................ F16J 15/18 277/512 |
| 3,082,011 | A | | 3/1963 | Kroekel |
| 3,233,824 | A | * | 2/1966 | Johnson .............. F16J 15/18 277/518 |
| 3,333,856 | A | | 8/1967 | Voitik |
| 3,368,819 | A | | 2/1968 | Otto |
| 3,402,937 | A | | 9/1968 | Park et al. |
| 3,511,513 | A | | 5/1970 | Dahlheimer |
| 4,377,290 | A | | 3/1983 | Netzel |
| 4,413,831 | A | | 11/1983 | Washida et al. |
| 4,416,543 | A | * | 11/1983 | Brinkmann ............. B01F 7/14 366/288 |
| 4,482,194 | A | | 11/1984 | Chambers, Sr. |
| 5,056,758 | A | | 10/1991 | Bramblet |
| 5,188,377 | A | | 2/1993 | Drumm |
| 5,346,136 | A | | 9/1994 | Bassett |

(Continued)

FOREIGN PATENT DOCUMENTS

| | | |
|---|---|---|
| DE | 10012672 | 9/2001 |
| GB | 618167 | 2/1949 |

(Continued)

OTHER PUBLICATIONS

AESSEAL CURC (TM) Range of Single Cartridge 2003 http://www.arthomson.com/Literature/brochures/MechSeals/AESSEAL/SingleCartridgeSeals/L_UK_CURC_.pdf.

(Continued)

*Primary Examiner* — Abbas Rashid
(74) *Attorney, Agent, or Firm* — O'Shea Getz P.C.

(57) ABSTRACT

A shaft seal assembly for sealing along a rotor shaft is provided. The shaft seal assembly includes a seal housing, annular inner and outer seal members, an annular middle element, and an end plate. The seal housing has a seal member bore and a shaft bore. The annular inner and outer seal members are configured to be disposed in the seal member bore. The middle element is disposed between the inner seal member and the outer seal member within the seal member bore. The end plate is attached to the seal housing and covers a portion of the seal member bore. The middle element biases the inner seal member against the seal housing and biases the outer seal member against the end plate.

21 Claims, 8 Drawing Sheets

(56) References Cited

U.S. PATENT DOCUMENTS

| | | | |
|---|---|---|---|
| 5,865,441 | A | 2/1999 | Orlowski |
| 6,419,233 | B2 | 7/2002 | Orlowski |
| 7,090,403 | B2 | 8/2006 | Orlowski et al. |
| 7,396,017 | B2 | 7/2008 | Orlowski et al. |
| 7,631,878 | B1 | 12/2009 | Orlowski et al. |
| 2008/0079222 | A1 | 4/2008 | Namuduri et al. |
| 2010/0119368 | A1 | 5/2010 | Fos et al. |
| 2011/0198813 | A1 | 8/2011 | Takahashi |

FOREIGN PATENT DOCUMENTS

| | | |
|---|---|---|
| GB | 1212870 | 11/1970 |
| JP | 7042848 | 2/1995 |

OTHER PUBLICATIONS

International search report for PCT/US2013/072644 dated Sep. 10, 2014.
Chinese office action for CN201380081314.2 dated Mar. 27, 2017.

\* cited by examiner

ROTOR SHAFT SEAL ASSEMBLY

BACKGROUND OF THE INVENTION

1. Technical Field

The present invention relates to machinery with one or more rotating shafts in general, and to seals for rotating shafts in particular.

2. Background Information

Many types of machinery include one or more rotating shafts disposed within a housing. Often, it is necessary to provide a seal for sealing the interface between the housing and the rotating shaft. In many instances, the environment in which the machinery operates is a harsh environment wherein materials can potentially enter the shaft seal and compromise the performance of the seal. In addition, the rotating shafts are often subject to deflection and travel which can cause mechanical damage to the seal. Consequently there is a need for a shaft seal that can effectively seal in a harsh environment and one that can accommodate rotor shaft deflection and misalignment.

SUMMARY OF THE INVENTION

According to an aspect of the present invention, a shaft seal assembly for sealing along a rotor shaft is provided. The shaft seal assembly includes a seal housing, an annular inner seal member, an annular outer seal member, an annular middle element, and an end plate. The seal housing has an interior surface, an exterior surface, an outer radial surface, a seal member bore, and a shaft bore. The shaft bore is configured to receive the rotor shaft. The annular inner and outer seal members are configured to be disposed in the seal member bore. The middle element is disposed between the inner seal member and the outer seal member within the seal member bore. The end plate has a shaft bore. The end plate is attached to the seal housing and covers a portion of the seal member bore. The middle element biases the inner seal member against the seal housing and biases the outer seal member against the end plate.

According to another aspect of the present invention, a shaft seal assembly for sealing along a rotor shaft is provided. The shaft seal assembly includes a seal housing, an annular inner seal member, an annular outer seal member, an annular middle element, and an end plate. The seal housing has an interior surface, an exterior surface, an outer radial surface, a seal member bore having an inner radial diameter, and a shaft bore. The annular inner seal member is configured to be disposed in the seal member bore. The inner seal member has an outer radial diameter. The annular outer seal member is configured to be disposed in the seal member bore. The outer seal member has an outer radial diameter. The annular middle element is disposed between the inner seal member and the outer seal member within the seal member bore. The end plate has a shaft bore. The end plate is attached to the seal housing and covers a portion of the seal member bore. The seal member bore inner radial diameter is greater than the outer radial diameters of the inner seal member and the outer seal member.

According to another aspect of the present invention, a continuous mixer is provided. The continuous mixer includes a housing, at least one rotor shaft, and at least one shaft seal assembly. The rotor shaft is operable to be rotated about an axis of rotation within the housing. The shaft seal assembly is the same as that described above.

According to another aspect of the present invention, a compact processor is provided. The compact processor includes a frame, a continuous mixer, an extruder, and an extruder hopper chute. The continuous mixer includes a housing, at least one rotor shaft operable to be rotated about an axis of rotation within the housing, and at least one shaft seal assembly for sealing along the rotor shaft. The shaft seal assembly is the same as that described above. The extruder hopper chute extends between the continuous mixer and the extruder.

Embodiments of any of the above described aspects of the present invention may also include one or more of the following elements. For example, the seal housing may include at least one fluid port in communication with the seal member bore, which fluid port provides a fluid passage into the seal member bore. As another example, the inner seal member and/or outer seal member may include a lip seal for engagement with the rotor shaft. As another example, the shaft seal assembly may include at least one anti-rotation member operable to prevent rotation of the inner seal member, and at least one anti-rotation member operable to prevent rotation of the outer seal member. As another example, the shaft seal assembly may include an inner seal member retention ring and/or an outer seal member retention ring. As another example, the seal member bore has an inner radial diameter, the inner seal member has an outer radial diameter, and the outer seal member has an outer radial diameter. The seal member bore inner radial diameter is greater than the outer radial diameters of the inner seal member and the outer seal member to permit the seal members to float radially within the seal member bore.

The above described aspects of the present invention and embodiments may be used individually or in combination with one another, and the present invention is not limited to any particular configuration. These and other aspects, embodiments, features, and advantages of the present invention will become apparent in light of the detailed description of the invention provided below, and as illustrated in the accompanying drawings.

DETAILED DESCRIPTION OF THE INVENTION

Figure 1:
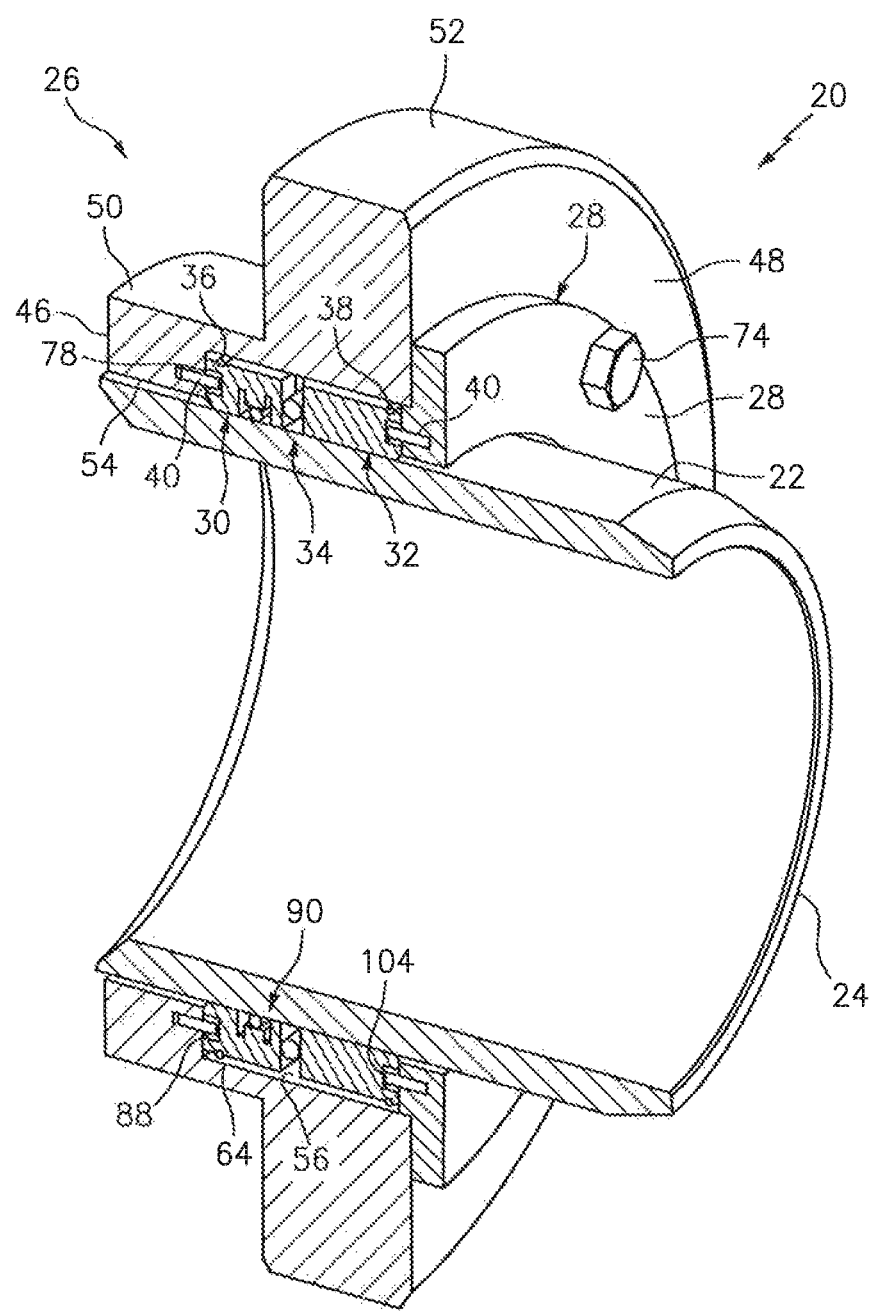
FIG. 1 is a diagrammatic perspective sectioned view of an embodiment of the present shaft seal assembly.

Referring to FIGS. 1-9, a shaft seal assembly 20 for sealing along an exterior radial surface of a rotor shaft 24 is described herein. The rotor shaft 24 is rotatable about an axis of rotation. The shaft seal assembly 20 may be used with a variety of different machinery types, and in a variety of different applications. The present shaft seal assembly 20 is not limited to use with any specific machinery type or for use in any specific application. The present shaft seal assembly 20 does, however, have particular utility in a continuous mixer application as will be explained below.

Now referring to FIGS. 1-4, the shaft seal assembly 20 includes a seal housing 26, an end plate 28, an annular inner seal member 30, an annular outer seal member 32, and an annular middle element 34. In some embodiments, the shaft seal assembly 20 further includes an inner seal member retention ring 36 and an outer seal member retention ring 38, and/or one or more anti-rotation members 40. The shaft seal assembly 20 is rotationally stationary relative to the rotor shaft 24. The rotor shaft 24 has an exterior surface portion (referred to hereinafter as a "seal surface 22") with an outer radial diameter 42 (see FIG. 2), which seal surface 22 is aligned with the shaft seal assembly 20 when the seal assembly 20 and shaft 24 are in their respective operating positions. In some applications, the rotor shaft 24 may include a removable sleeve 44 (e.g., see FIG. 5) that can be replaced in the event of wear, and/or to provide a particular seal surface material, etc. To facilitate the present description, the rotor shaft seal surface 22 is described herein as being integral with the rotor shaft 24, but the present shaft seal assembly 20 is not limited to any particular rotor shaft configuration. The present shaft seal assembly 20 is operable to inhibit movement of materials out of the machinery; e.g., materials exiting the machinery in the region between the shaft seal assembly 20 and the shaft seal surface 22, or otherwise across the shaft seal assembly 20.

Figure 2:
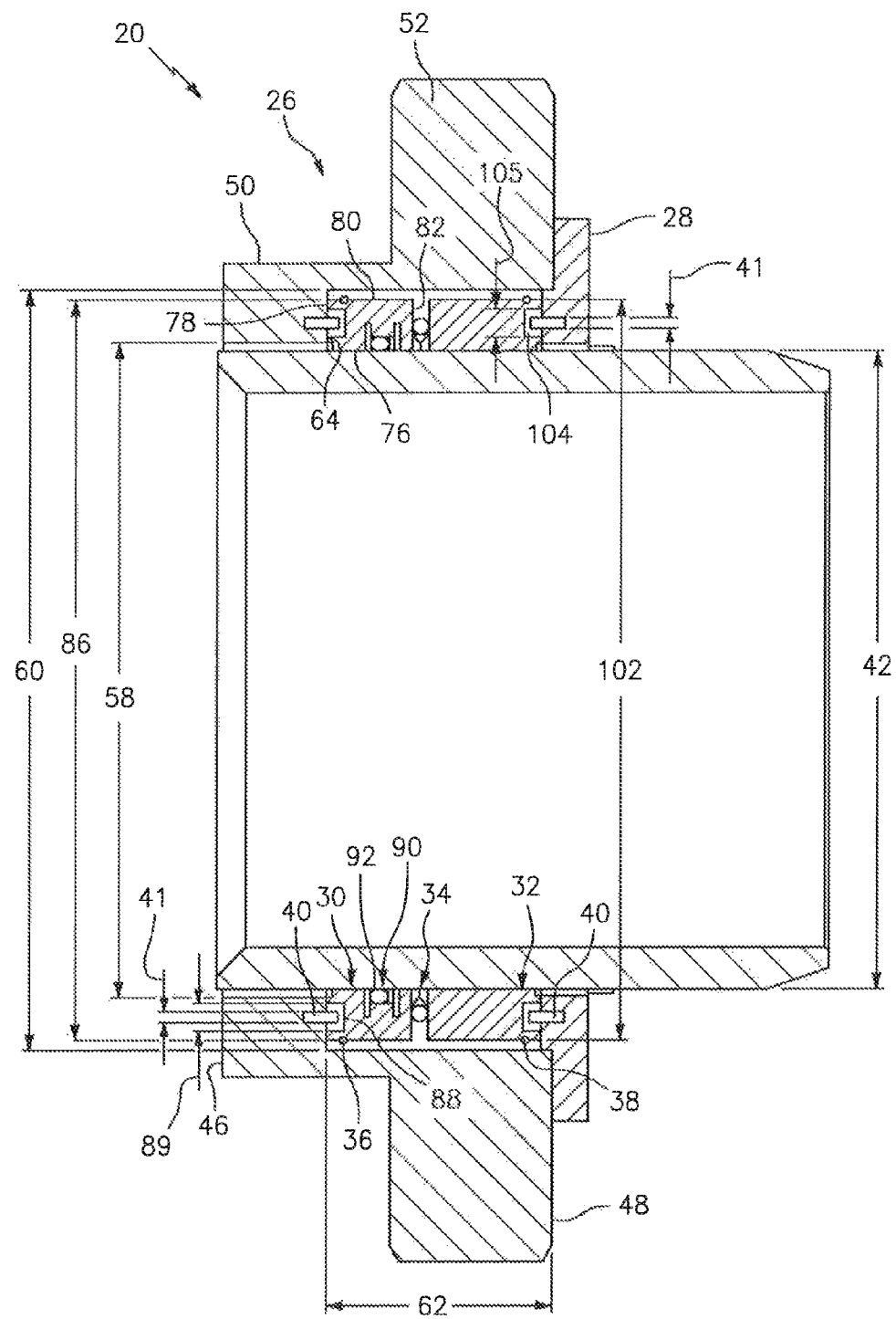
FIG. 2 is a diagrammatic sectioned view of an embodiment of the present shaft seal assembly.

In the embodiments shown in FIGS. 1 and 2, the seal housing 26 has an interior end surface 46, an exterior end surface 48, an outer radial surface 50, a radially outwardly extending flange 52, a shaft bore 54, and a seal member bore 56. This seal housing 26 configuration represents a non-limiting example of a seal housing 26. The shaft bore 54 has an inner radial diameter 58 (see FIG. 2) that is larger than the outer radial diameter 42 of the shaft seal surface 22 (e.g., a clearance fit) to permit the shaft 24 to be received within the seal housing 26, and typically extends through the seal housing 26. The seal member bore 56 has an inner radial diameter 60 and depth 62 (see FIG. 2) extending between a base surface 64 and the housing exterior end surface 48.

Figure 3:
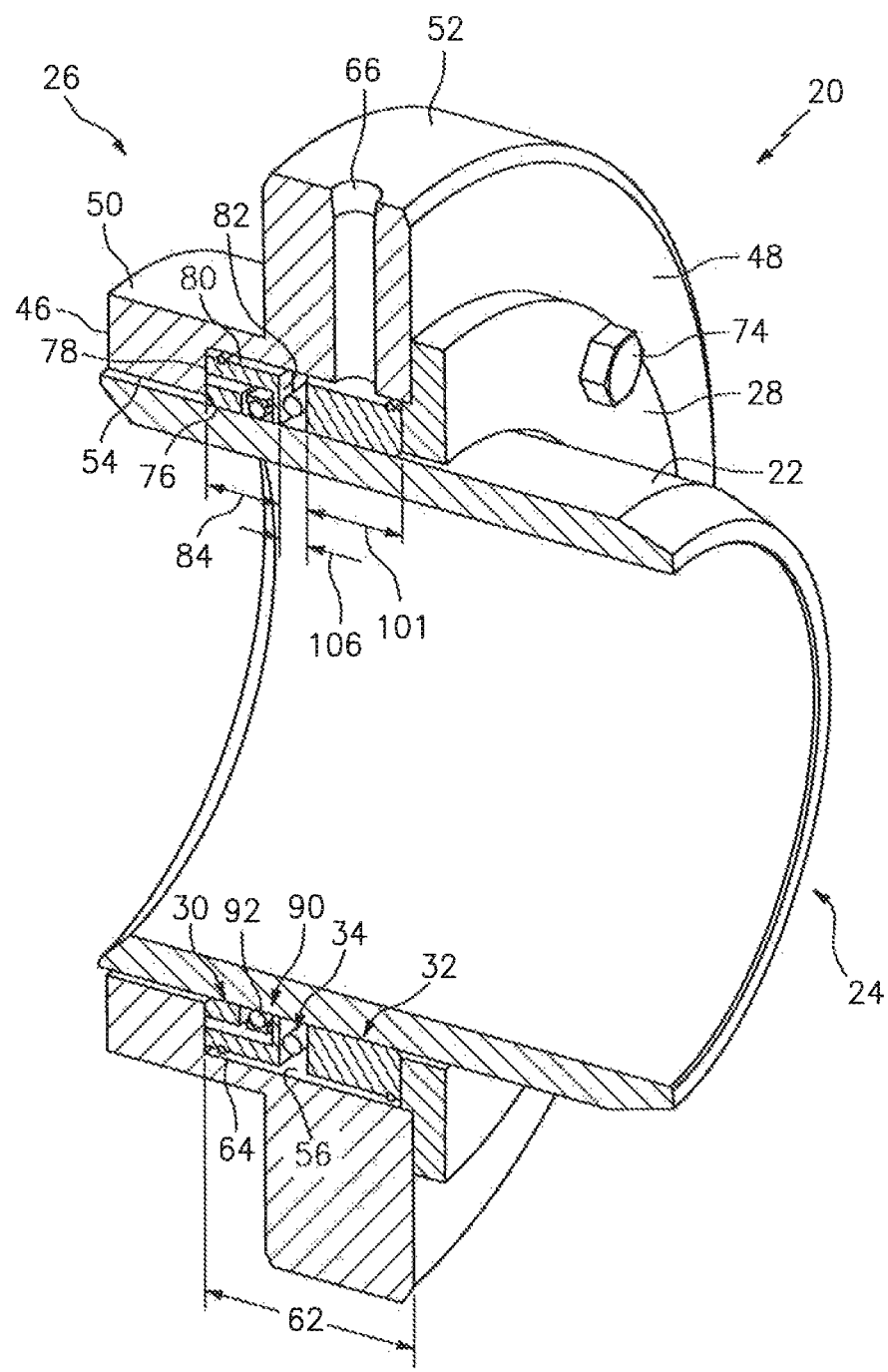
FIG. 3 is a diagrammatic perspective sectioned view of an embodiment of the present shaft seal assembly.
Figure 4:
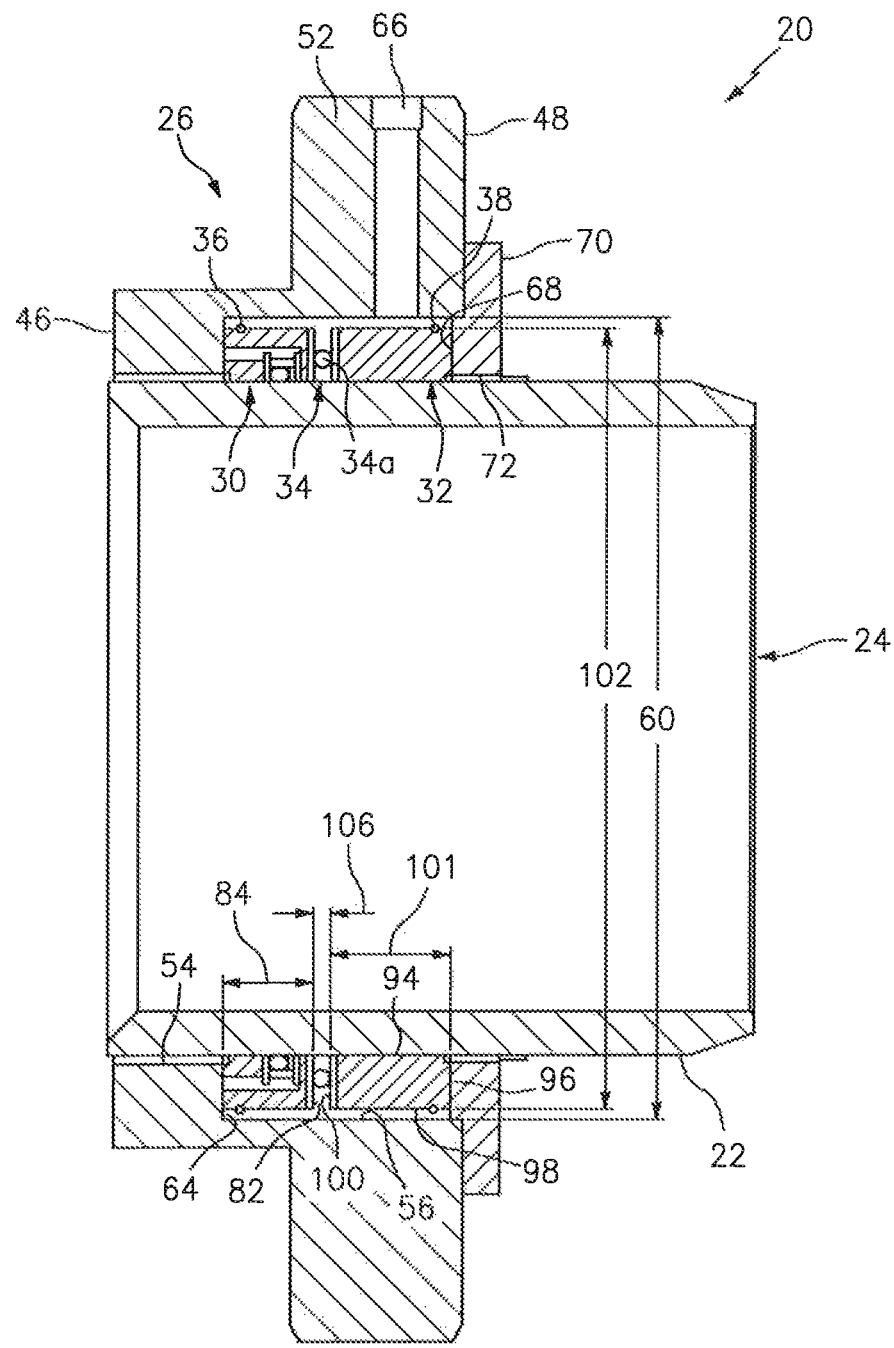
FIG. 4 is a diagrammatic sectioned view of an embodiment of the present shaft seal assembly.
Figure 5:
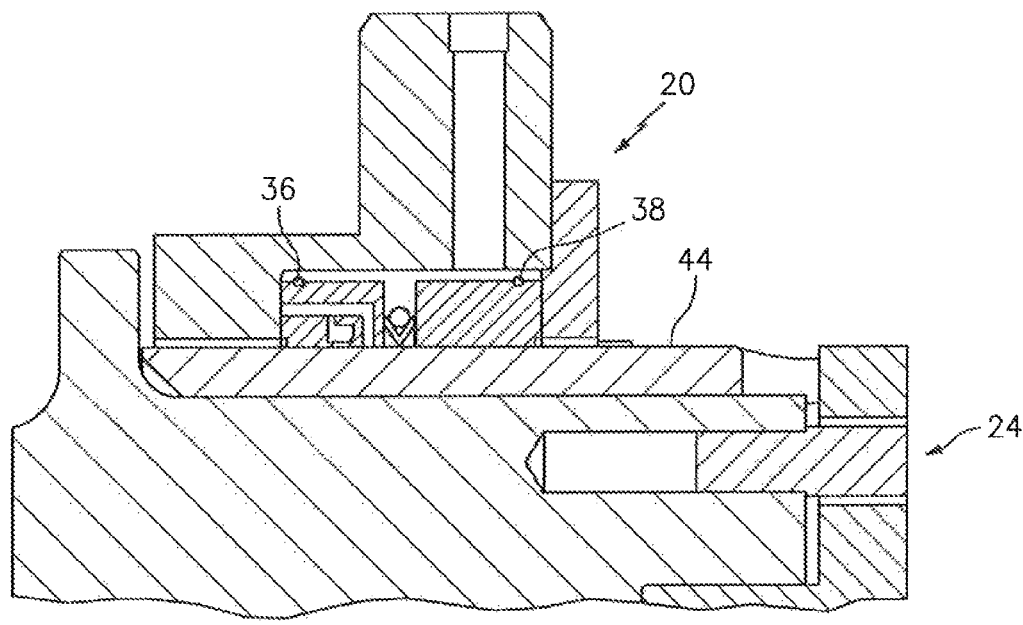
FIG. 5 is a diagrammatic partial sectioned view of an embodiment of the present shaft seal assembly, illustrating an application wherein the rotor shaft includes a removable wear sleeve.

Referring to FIGS. 3 and 4, in some applications, the seal housing 26 includes one or more fluid ports 66 disposed in the housing 26 to permit the passage of a fluid (e.g., an inert gas) from outside the shaft seal assembly 20 and into the seal member bore 56. For example, in FIGS. 3 and 4 a fluid port 66 extends through the flange 52, providing a fluid passage from outside the shaft seal assembly 20 into the seal member bore 56. The types of fluid that may be passed into the seal member bore 56, and the purpose for passing such a fluid into the seal member bore 56, are discussed below.

The end plate 28 includes a seal side surface 68, an oppositely disposed exterior side surface 70, a thickness extending there between, and a shaft bore 72 having a diameter, which bore 72 extends between the two side surfaces 68, 70 (see FIG. 4). The end plate 28 is configured for attachment to the seal housing 26. FIGS. 1 and 3 illustrate the end plate 28 attached to the seal housing 26 by mechanical fasteners 74; e.g., screws.

The annular inner seal member 30 includes a shaft surface 76, a bore surface 78, an outer radial surface 80, a middle surface 82, and a width 84 (see FIGS. 3 and 4). The shaft surface 76 is configured to mate with the seal surface 22 of the rotor shaft 24. The bore surface 78 is configured to mate with the base surface 64 of the seal member bore 56 of the housing 26. The outer radial surface 80 has a radial diameter 86 that is less than that of the inner radial diameter 60 of the seal member bore 56 of the seal housing 26. The difference between the outer radial seal surface diameter 86 and the inner radial diameter 60 of the seal member bore 56 provides radial clearance there between and allows for radial displacement of the inner seal member 30 relative to the seal member bore 56 as will be discussed below. The material(s) of the inner seal member 30 is selected so that any radial thermal expansion that exists during operating conditions will not eliminate the radial clearance between the outer radial surface diameter 86 and the inner radial diameter 60 of the seal member bore 56. In addition, the inner seal member 30 is preferably made of a material having a coefficient of friction that allows movement of the inner seal member 30 relative to the seal housing 26. Alternatively, the bore surface 78 of the inner seal member 30 may be coated (or otherwise covered) with a material having a coefficient of friction that allows movement of the inner seal member 30 relative to the seal housing 26. A non-limiting example of an acceptable inner seal member material is polytetrafluoroethylene (PTFE), which material is produced under the trademark Teflon® by the E.I. duPont Company.

In the embodiments shown in FIGS. 1 and 2, the bore surface 78 of the inner seal member 30 includes one or more cavities 88 (e.g., a single annular groove, or a plurality of annularly disposed cavities, etc.) for receiving one or more anti-rotation members 40, which anti-rotation members 40 extend axially out from the base surface 64 of the seal member bore 56. The cavity 88 (or cavities) has a radially extending dimension 89 that is greater than the radial dimension 41 of the anti-rotation member 40 to permit radial movement of the inner seal member 30. The cavity 88 may have an elongated configuration that has a minor axis that is shorter than a major axis a (e.g., a groove), but is not limited to this configuration. As an alternative to the one or more anti-rotation members 40, the base surface 64 of the seal member bore 56 (disposed in the seal housing 26) may include a rib (or other protruding feature) that extends radially outward from the base surface 64 of the seal member bore 56. In addition, in alternative embodiments, the male and female components of the inner seal member 30 and the anti-rotation member(s) 40 may be switched; e.g., the anti-rotation member 40 (or rib) may extend out from the inner seal member 30 and the base surface 64 of the seal member bore 56 may include the cavity 88 (or cavities).

Referring to FIGS. 1-4, in some embodiments the inner seal member 30 may include one or more lip seals 90, each having a lip 92 disposed relative to the shaft 24 for engagement with the seal surface 22 of the rotor shaft 24 to provide a seal there between.

The annular outer seal member 32 includes a shaft surface 94, an end plate surface 96, an outer radial surface 98, a middle surface 100, and a width 101. The shaft surface 94 is configured to mate with the seal surface 22 of the rotor shaft 24. The end plate surface 96 is configured to mate with the seal side surface 68 of the end plate 28. The outer radial surface 98 has a radial diameter 102 that is less than that of the inner diameter 60 of the seal member bore 56 of the seal housing 26. The difference between the outer radial seal surface diameter 102 and the inner diameter 60 of the seal member bore 56 provides radial clearance there between and allows for radial displacement of the outer seal member 32 relative to the seal member bore 56 as will be discussed below. The material of the outer seal member 32 is selected so that any radial thermal expansion that exists during operating conditions will not eliminate the radial clearance between the outer radial surface diameter 102 and the inner radial diameter 60 of the seal member bore 56. In addition, the outer seal member 32 is made of a material having a coefficient of friction that allows movement of the outer seal member 32 relative to the end plate 28. Alternatively, the end plate surface 96 of the outer seal member 32 may be coated (or otherwise covered) with a material having a coefficient of friction that allows movement of the outer seal member 30 relative to the end plate 28. A non-limiting example of an acceptable outer seal member material is polytetrafluoroethylene (PTFE), which material is produced under the trademark Teflon® by the E.I. duPont Company. Typically, but not necessarily, the radial diameters 86, 102 of outer radial surfaces 80, 98 of the inner seal member 30 and the outer seal member 32 equal one another.

In the embodiments shown in FIGS. 1 and 2, the end plate surface 96 of the outer seal member 32 includes one or more cavities 104 (e.g., a single annular groove, or a plurality of annularly disposed cavities, etc.) for receiving one or more anti-rotation members 40, which anti-rotation members 40 extend axially out from the seal surface 68 of the end plate 28. The cavity 104 (or cavities) has a radial dimension 105 that is greater than the radial dimension 41 of the anti-rotation member 40 to permit radial movement of the outer seal member 32. The cavity 104 may have an elongated configuration that has a minor axis that is shorter than a major axis (e.g., a groove), but is not limited to this configuration. As an alternative to the one or more anti-rotation members 40, the seal side surface 68 of the end plate 28 may include a rib (or other protruding feature) that extends radially outward from the seal side surface 68 of the end plate 28. In addition, in alternative embodiments, the male and female components of the outer seal member 32 and the anti-rotation member(s) 40 may be switched; e.g., the anti-rotation member 40 (or rib) may extend out from the outer seal member 32 and the seal side surface of the end plate 28 may include a cavity (or cavities).

In some embodiments, the outer seal member 32 may include one or more lip seals, each having a lip disposed relative to the shaft surface for engagement with the seal surface 22 of the rotor shaft 24 to provide a seal there between.

The shaft seal assembly embodiments shown in FIGS. 3 and 4 include an inner seal member retention ring 36 and an outer seal member retention ring 38. Each retention ring 36, 38 extends around the circumference of its respective seal member 30, 32, providing mechanical support to the respective seal member 30, 32, and inhibiting radial thermal growth of the respective seal member 30, 32.

The annular middle element 34 is disposed between and is in contact with the middle surface 82, 100 of each seal member 30, 32. The middle element 34 is operable to bias the inner seal member 30 and the outer seal member 32 axially away from one another, when the seal members 30, 32 and middle member 34 are disposed within the seal member bore 56 and the seal member bore 56 is covered by the end plate 28. The biasing force is sufficient to maintain the bore surface 78 of the inner seal member 30 in contact with the base surface 64 of the seal member bore 56 of the seal housing 26, and to maintain the end plate surface 96 of the outer seal member 32 in contact with the seal surface 68 of the end plate 28. The biasing force is not, however, great enough to prevent radial movement of the seal members 30, 32 relative to the seal housing 26.

An example of an acceptable embodiment of a middle element 34 is shown in FIGS. 1-4. In this embodiment, the middle element 34 is an elastically compressible O-ring 34a (see FIG. 4) that has a cross-sectional diameter; i.e., a width 106. The widths 84, 101, 106 of the inner seal member 30, outer seal member 32, and the O-ring 34a are collectively such that when they are disposed within the seal member bore 56 of the seal housing 26 and the end plate 28 is attached, the O-ring is elastically compressed; i.e., the collective widths under operational parameters are greater than the depth 62 (see FIG. 2) of the seal member bore 56 of the seal housing 26. The elastically compressed O-ring biases the seal members 30, 32 axially outwardly, thereby maintaining the bore surface 78 of the inner seal member 30 in contact with the base surface 64 of the seal member bore 56, and maintaining the end plate surface 96 of the outer seal member 32 in contact with the seal surface 68 of the end plate 28. An example of an acceptable O-ring is one made of Viton® fluoroelastomer produced by the E. I duPont Company.

Figure 6:
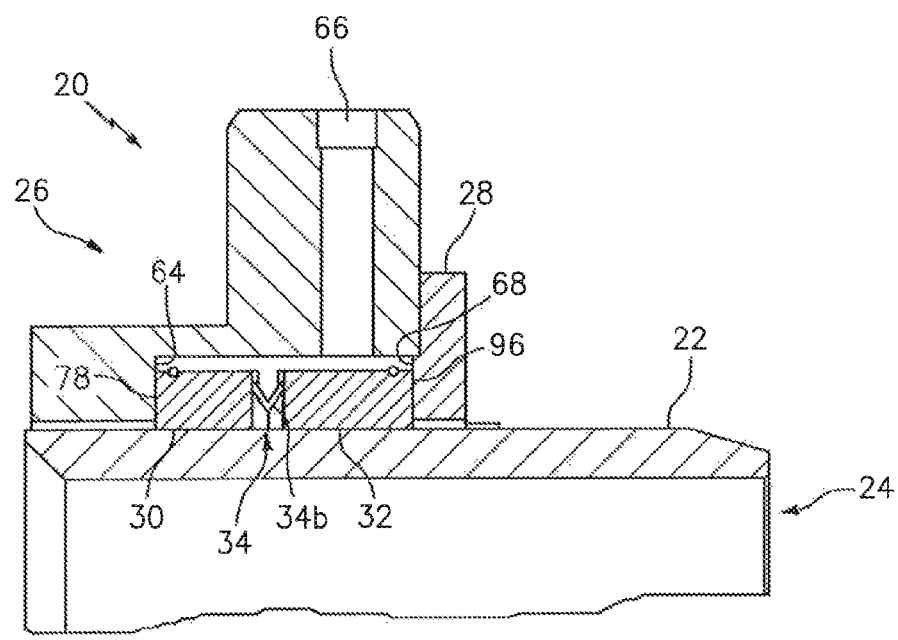
FIG. 6 is a diagrammatic partial sectioned view of an embodiment of the present shaft seal assembly, illustrating an embodiment of the middle element.

Referring to FIG. 6, in other embodiments the middle element 34 may be a ring structure 34b with a cross-sectional configuration (e.g., a "V" shape, or a "W" shape, etc.) that is sufficiently elastically compressible to bias the seal members 30, 32 axially outwardly and to maintain the bore surface 78 of the inner seal member 30 in contact with the base surface 64 of the seal member bore 56, and to maintain the end plate surface 96 of the outer seal member 32 in contact with the seal surface 68 of the end plate 28.

Figure 7:
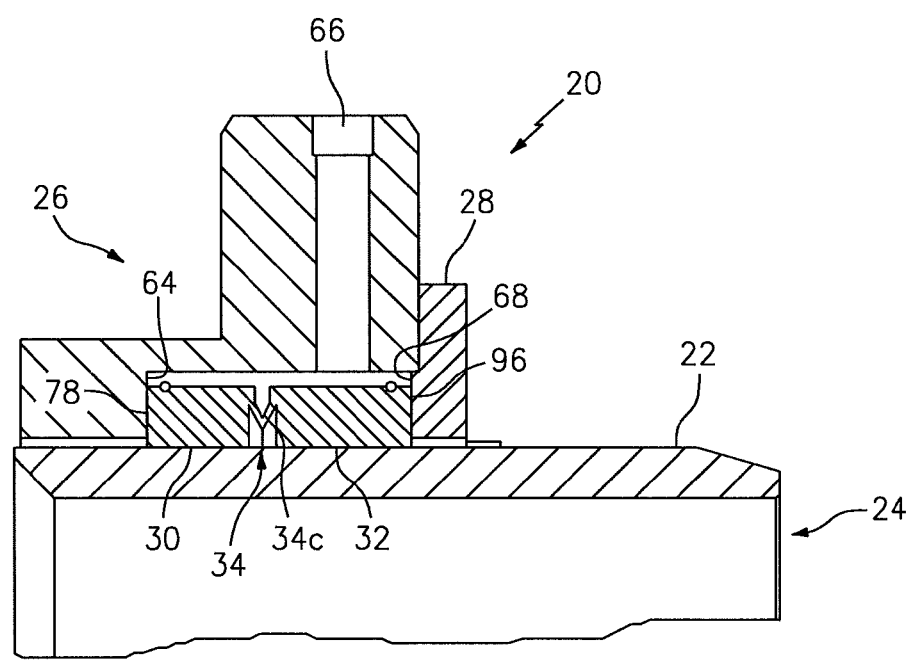
FIG. 7 is a diagrammatic partial sectioned view of an embodiment of the present shaft seal assembly, illustrating an embodiment of the middle element.

Referring to FIG. 7, in another embodiment the middle element 34 may be integrally formed with the inner and outer seal 30, 32. For example, a single body may be formed (e.g., molded) with the inner and outer seal members 30, 32 and a V-shaped middle element 34c extending there between. Alternatively, the combined structure (e.g., seal members 30, 32 and middle element 34c) may start as a single body that is subsequently machined to create the various features (e.g., a "V" shaped middle element 34c, annular grooves, etc.).

In those embodiments of the shaft seal assembly 20 in which the seal housing 26 includes one or more fluid ports 66, the shaft seal assembly 20 is configured to provide fluid purge paths 108 (see FIG. 8) that allow a fluid (referred to hereinafter as "purge fluid") to enter the seal housing seal member bore 56, and subsequently exit each end of the shaft seal assembly 20 along the rotor shaft seal surface 22. The term "purge fluid" is used herein to refer to the fluid passing through the shaft seal assembly 20, which fluid may provide a plurality of functions (e.g., purging material, cooling, etc.) as is not limited to any particular function. The specific type of fluid used can be chosen based on the application at hand. For example, in many instances an inert gas such as air or nitrogen provides an acceptable purge fluid. The present shaft seal assembly 20 is not limited to using any particular fluid, however. The purge fluid may be provided to the present shaft seal assembly 20 by a pressurized source; e.g., air or nitrogen gas provided from a reservoir and/or a pump at a pressure higher than ambient pressure and at a given volumetric flow rate. The specific pressure and volumetric flow of the purge fluid provided at the fluid port 66 can be selected based on the application at hand.

Figure 8:
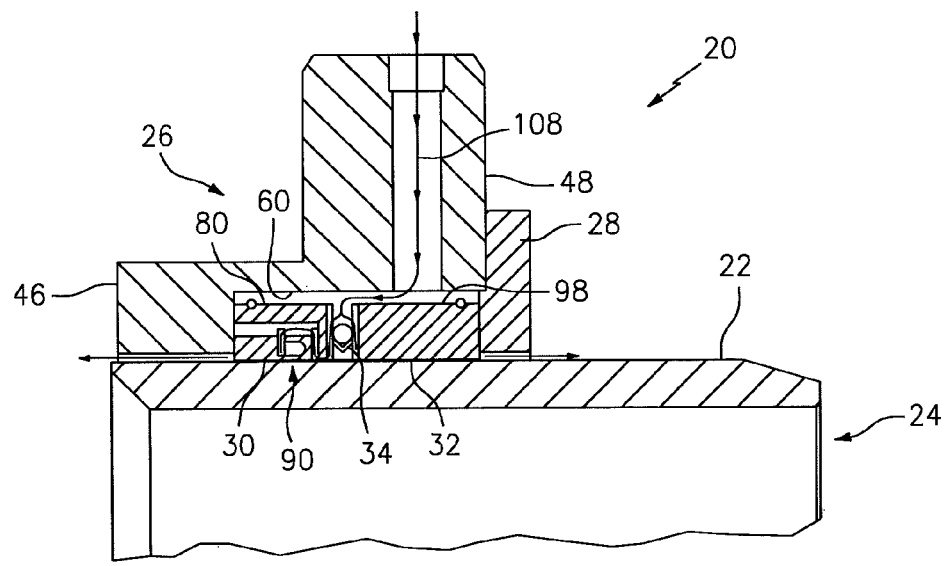
FIG. 8 is a diagrammatic partial sectioned view of an embodiment of the present shaft seal assembly, illustrating an example of a purge fluid path through the present shaft seal assembly.

The diagrammatic depiction shown in FIG. 8 illustrates an exemplary fluid path 108 wherein purge fluid (e.g., air) enters the seal member bore 56 from a fluid port 66. The purge fluid travels from the port 66 and enters the annular void region disposed between the outer radial surfaces 80, 98 of the seal members 30, 32 and inner diameter 60 of the seal member bore 56 (see also FIGS. 1-4). The purge fluid subsequently travels into the region between the two seal members 30, 32, passes by the middle element 34 (e.g., via passages formed in the middle surface 82, 100 of one or both seal member 30, 32), and exits the shaft seal assembly 20 between the shaft surfaces 76, 94 of the seal members 30, 32 and the seal surface 22 of the rotor shaft 24. In those embodiments that include a lip seal 90 disposed in the inner seal member 30 (and/or one disposed in the outer seal member 32), the fluid path may also direct purge fluid relative to the lip seal 90 to clean/cool the lip seal as will be discussed below. For example, the seal member 30, 32 may include fluid path passages directing purge fluid on one or both sides of the lip seal 90. The pressurized purge fluid can also be directed to help bias the lip seal 90 to maintain contact between the lip seal lip 92 and the seal surface 22 of the rotor shaft 24. The aforesaid fluid path illustrates a non-limiting example of how a fluid path 108 may be disposed within the present shaft seal assembly 20, and the present shaft seal is not limited to this particular fluid path.

The present shaft seal assembly 20 provides a seal assembly that seals around the seal surface 22 of the rotor shaft 24 not only when the rotor shaft 24 resides in its normal (i.e., non-deflected) position, but also provides such sealing while accommodating radial and axial movement of the rotor shaft 24 relative to the normal position.

Figure 9:
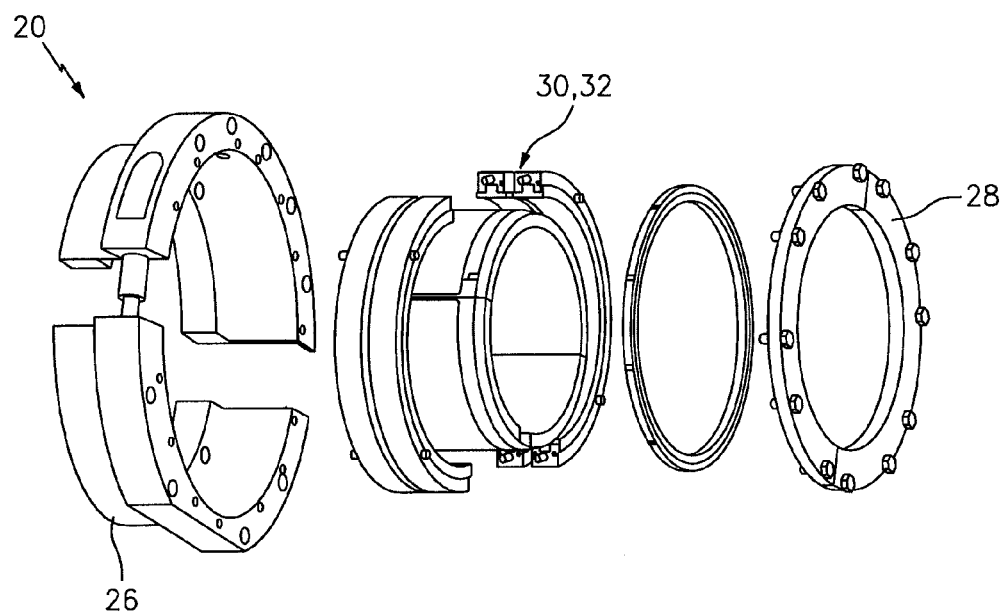
FIG. 9 is a diagrammatic perspective exploded view of an embodiment of the present shaft seal assembly.

The components of the present shaft seal assembly 20 (e.g., the seal housing 26, the end plate 28, annular seal members 30, 32, annular middle element 34, etc.) may each be implemented in a unitary form or in a plurality of sections that can be combined to form a unitary form. In FIGS. 1-4 for example, a sectional view of a unitary implementation of the present shaft assembly 20 is shown. In FIG. 9, an implementation of the present shaft seal assembly 20 where the components are split is shown. The present shaft seal assembly 20 is not limited to either of these implementations; e.g., the present shaft seal assembly 20 may include more than two sections, or the present shaft seal assembly 20 may include certain components in unitary form and others in sectional form.

To illustrate the utility of the present shaft seal assembly 20, the operation of the shaft seal assembly 20 within a continuous mixer will be described hereinafter.

Figure 10:
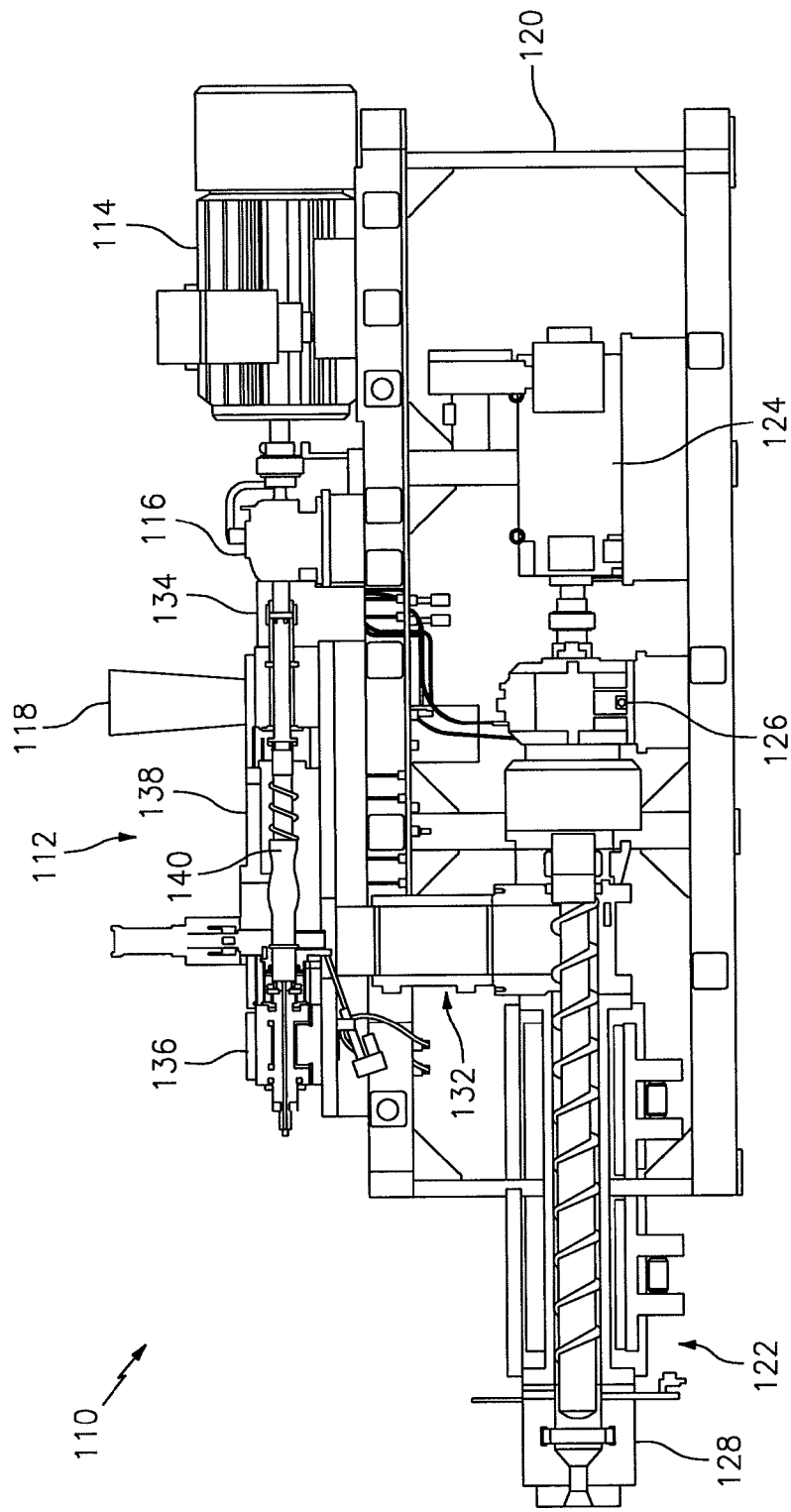
FIG. 10 is a diagrammatic view of a compact processor that includes a continuous mixer, in which a present shaft seal assembly may be used.

FIG. 10 illustrates a compact processor 110 that includes a continuous mixer 112, a mixer drive motor 114, a mixer gearbox 116, and a mixer hopper 118, all mounted on the top level of a frame 120. The processor 110 further includes an extruder 122, an extruder drive motor 124, an extruder gearbox 126, and a screen changer 128 and a pelletizer (not shown), all mounted on the lower level of the frame 120. An extruder hopper chute 132 extends between a discharge of the continuous mixer 112 and an inlet of the extruder 122. In a polymer mixing application, materials to be mixed into a desired polymer compound pass from the mixer hopper 118 into the continuous mixer 112 through a material feed inlet. The materials are mixed within the mixer 112, are subsequently forced out of the mixer 112 and into the extruder hopper chute 132, and then pass into the extruder 122. The extruder 122 pumps the mixed polymer material axially through the extruder, through the screen changer 128, and into the pelletizer, where the polymer material is formed into pellets which can then be collected and stored for subsequent use. The above described compact processor 110 represents a particular embodiment of a compact processor, and the present shaft seal assembly 20 is not limited to use therewith.

The continuous mixer 112 includes a drive end frame 134, a water end frame 136, and a mixing chamber 138 disposed there between. A pair of rotors 140 is rotatably mounted within the mixer 112, extending between the frames 134, 136, through the mixing chamber 138. Each rotor 140 has a bearing journal and a seal surface 22 (e.g., see FIGS. 1-4) adjacent each axial end and a mixing flight disposed there between configured to work and mix the materials. Shaft seal assemblies 20 may be disposed within the end frames 134, 136; each aligned with the respective seal surface 22 of the respective rotor.

In the operation of the continuous mixer 112, materials to be mixed (which process is sometimes referred to "compounding") are deposited in the mixer hopper 118 and are subsequently fed into the mixer 112 via the material feed inlet. As indicated above, in a polymer mixing application the materials entering the continuous mixer 112 may be in powder or granular form. Most mixers 112 are designed to keep mixing materials away from a shaft seal assembly 20 when the mixer is being operated under manufacturer recommended operating parameters. Under some operating conditions, however, it is possible for some amount of the polymer materials to enter the shaft seal region. If the mixer 112 is being operated outside of the recommended operating parameters, the potential for powdered or granular materials to enter the shaft seal region is higher. For example, if a prior art continuous mixer is operated outside of recommended operating procedures, gas pressure within the mixing chamber may exceed a normal operating pressure. As a result, gases disposed within the mixing chamber may exit the mixer past a shaft seal. The escaping gas can provide a motive force that pushes mixing materials into the shaft seal region, causing the shaft seal to be compromised and mixing material to escape the mixer.

Some prior art shaft seal designs can also be compromised when the rotor with which they are sealing deflects during operation. The rotor deflection (typically caused by mechanical loads applied to the rotor) can create undesirable clearances between the shaft seal and rotor shaft and/or can cause mechanical damage (e.g., excessive wear) to the shaft seal. There are several ways rotors can deflect within a machine such as a continuous mixer. For example, under certain circumstances a rotor can deflect axially such that the rotor's axis of rotation deviates from a straight line. As another example, under certain circumstances a rotor can deflect such that an end of the rotor is displaced from its normal position. In this instance, the rotor's axis of rotation may remain straight, but is displaced from its normal position within the machine. In both of these examples, a shaft seal disposed at the end of the rotor can be compromised temporarily or permanently. Within a continuous mixer, if a shaft seal disposed in the drive end frame is compromised, the potential for material escape is increased due to the close proximity of the material inlet and the use of powdered and/or granular materials.

The present shaft seal assembly 20 addresses the shortcomings of prior art shaft seals created during machine operation. For example, the present shaft seal assembly 20 is configured so that the seal members 30, 32 can travel radially some amount within the seal member bore 56 of the seal housing 26. The specific amount of radial travel permitted can vary depending upon the machinery application in which the shaft seal assembly 20 is used. For example, in a continuous mixer application that uses rotors having a diameter of about six to seven inches (i.e., 6-7 inches; 150-180 mm), the shaft seal assembly may allow radial movement in the range of forty to one-hundred thousandths of an inch (i.e., 0.040-0.100 inches; 1.0-2.5 mm). For sake of clarity, the described radial movement is movement of the rotor shaft from its normal centered position, in any radial direction prior to contact between the outer radial surfaces 80, 98 of the seal members 30, 32 and the inner radial diameter 60 of the seal member bore 56. The ability of the seal members 30, 32 to travel radially relative to the housing 26 is significant for at least three reasons. First, the ability of the seal members 30, 32 to radially travel (i.e, "float") relative to the housing permits some amount of misalignment between the rotor centerlines and the seal housing without detrimentally affecting the performance of the shaft seal assembly. This aspect greatly simplifies the assembly of the device. Second, the ability of the seal members 30, 32 to travel radially within the present seal shaft assembly 20 is also significant because it allows the shaft seal assembly 20 to accommodate rotor shaft 24 travel/deflection. The seal members 30, 32 are mounted relative to the rotor shaft seal surface 22, and the seal housing 26 is attached to the body of the machine (e.g., the drive end frame of the continuous mixer). If the rotor shaft 24 moves radially relative to the seal housing 26, the seal members 30, 32 travel with the rotor shaft 24 and such radial movement is accommodated without binding (and/or potential mechanical damage) by the annular void region between the outer radial surfaces 80, 98 of the seal members 30, 32 and the inner diameter 60 of the seal member bore 56. Third, the present shaft seal assembly permits a greater range of materials to be used for the seal members 30, 32. In many instances, a material well suited for the performance requirements of the seal member 30, 32 may have a coefficient of thermal expansion that is significantly different (e.g., greater) than the coefficient of thermal expansion of the seal housing 26. When the present shaft seal assembly 20 is operated at a higher than ambient temperature, the seal members 30, 32 can expand into the annular void region between the outer radial surfaces 80, 98 of the seal members 30, 32 and the inner diameter 60 of the seal member bore 56 (although such thermal expansion will not fill the aforesaid annular void region). As indicated above, the amount of radial thermal growth of a seal member can also be addressed using a retention ring 36, 38 extending around the circumference of the respective seal member 30, 32. In these instances, the present shaft seal assembly 20 accommodates the radial thermal growth and also allows for radial movement of the seal members 30, 32 and rotor shaft 24 relative to the seal housing 26.

The present shaft seal assembly 20 also permits axial deflection of the seal members 30, 32 and/or axial thermal expansion of the seal members 30, 32. As indicated above, the widths 84, 101, 106 of the seal members 30, 32 and the middle element 34 are collectively such that when they are disposed within the seal member bore 56 of the seal housing 26 and the end plate 28 is attached, the middle element 34 is elastically compressed. The elastic compressibility of the middle element 34 biases the seal members 30, 32 respectively into engagement with the seal member bore base surface 64 and the end plate 28, and at the same time accommodates axial thermal growth of the seal members 30, 32. Similarly, if a rotor shaft 24 deflects in a manner that includes an axial component, the elastic compressibility of the middle element 34 accommodates the axial deflection.

Another prior art shortcoming addressed by the present shaft seal assembly 20 is the potential of material entering the shaft seal assembly 20 and compromising the performance of the seal assembly 20. As indicated above, the possibility of material compromising a shaft seal assembly 20 is particularly acute for continuous mixer applications where powdered materials, granular materials, and the like are fed into the mixer adjacent a shaft seal assembly location. Embodiments of the present shaft seal assembly 20 address this issue by including a fluid port 66 and one or more purge fluid paths 108 through the shaft seal assembly 20. For example, in a continuous mixer application, air (or inert gas) at a pressure of ten (10) pounds per square inch (10 psi) and at a volumetric flow rate in the range of one hundred to one hundred and fifty cubic feet per hour (100-150 cuft/hr) can be applied at the fluid port 66. Once the air exits the fluid port 66, it passes into the annular void region disposed between the outer radial surfaces 80, 98 of the seal members 30, 32 and inner diameter 60 of the seal member bore 56. The air subsequently travels into the region between the two seal members 30, 32, passes by the middle element 34, and into the region between the shaft surfaces 76, 94 of the seal members 30, 32 and the seal surface 22 of the rotor shaft 24. From there, the air exits in both axial directions providing a positive pressure air flow that inhibits the entry of materials into the shaft seal assembly 20. At the same time, the air flow may also cool the shaft seal assembly 20, and thereby control thermal growth of the shaft seal assembly 20 components. In those embodiments that include a lip seal 90 disposed in a seal member 30, 32, the shaft seal assembly 20 can also be configured to include a fluid path 108 that directs air relative to the lip seal 90 (e.g., see FIG. 7) to clean and/or cool the lip seal. The pressurized air can also act to bias the lip seal 90 to maintain contact between the lip seal lip 92 and the seal surface 22 of the rotor shaft 24.

Although this invention has been shown and described with respect to the detailed embodiments thereof, it will be understood by those skilled in the art that various changes in form and detail thereof may be made without departing from the spirit and the scope of the invention.

What is claimed is:

1. A shaft seal assembly for sealing along a rotor shaft, the rotor shaft rotatable about an axis of rotation, the assembly comprising:

a seal housing having an interior surface, an exterior surface, an outer radial surface, a seal member bore, and a seal housing shaft bore, the seal housing shaft bore is configured to receive the rotor shaft;

an annular inner seal member configured to be disposed in the seal member bore;

an annular outer seal member configured to be disposed in the seal member bore;

an annular middle element disposed between the inner seal member and the outer seal member within the seal member bore; and an end plate having a an end plate shaft bore, wherein the end plate is attached to the seal housing and covers a portion of the seal member bore, the end plate shaft bore configured to receive the rotor shaft;

wherein the middle element biases the inner seal member against the seal housing and biases the outer seal member against the end plate;

wherein the annular inner seal member, the annular outer seal member, and the annular middle element are disposed within the seal housing in a manner so as to be substantially non-rotatable relative to the rotor shaft during rotation of the rotor shaft.

2. The shaft seal assembly of claim 1, wherein the seal housing includes at least one fluid port in communication with the seal member bore, the fluid port providing a fluid passage into the seal member bore; and wherein the inner seal member includes a shaft surface disposed proximate an exterior radial surface of the rotor shaft; and wherein the shaft seal assembly is configured to include a fluid path that allows a purge fluid entering the fluid port of the shaft seal assembly to exit the shaft seal assembly between the exterior radial surface of the rotor shaft and the shaft surface of the inner seal member.

3. The shaft seal assembly of claim 2, wherein the inner seal member includes a lip seal for engagement with the rotor shaft.

4. The shaft seal assembly of claim 3, wherein the inner seal member includes one or more fluid passages that permit fluid to pass on one or both sides of a lip of the lip seal.

5. The shaft seal assembly of claim 1, wherein the middle element is an O-ring.

6. The shaft seal assembly of claim 1, wherein the middle element is a ring structure that is elastically compressible in an axial direction.

7. The shaft seal assembly of claim 1, further comprising at least one first anti-rotation member operable to prevent rotation of the inner seal member, and at least one second anti-rotation member operable to prevent rotation of the outer seal member.

8. The shaft seal assembly of claim 7, wherein the inner seal member includes a bore surface having a bore surface cavity, the bore surface cavity having a radial dimension, and the first anti-rotation member extends out from the seal housing and into the bore surface cavity;

wherein the first anti-rotation member has a radial dimension, and the first anti-rotation member radial dimension is less than the bore surface cavity radial dimension.

9. The shaft seal assembly of claim 7, wherein the annular outer seal member includes an end plate surface having an end plate surface cavity, the end plate surface cavity having a radial dimension, and the second anti-rotation member extends out from the end plate and into the end plate surface cavity;

wherein the second anti-rotation member has a radial dimension, and the second anti-rotation member radial dimension is less than the end plate surface cavity radial dimension.

10. The shaft seal assembly of claim 1, further comprising an inner seal member retention ring disposed around a circumference of the inner seal member, and an outer seal member retention ring disposed around a circumference of the outer seal member.

11. The shaft seal assembly of claim 1, wherein the seal member bore has an inner radial diameter, and the inner seal member has an outer radial diameter, and the outer seal member has an outer radial diameter, and wherein the seal member bore inner radial diameter is greater than the outer radial diameters of the inner seal member and the outer seal member.

12. A continuous mixer, comprising:
a housing;
at least one rotor shaft operable to be rotated about an axis of rotation within the housing;
at least one shaft seal assembly for sealing along the rotor shaft, the shaft seal assembly including a seal housing having an interior surface, an exterior surface, an outer radial surface, a seal member bore, and a seal housing shaft bore, the seal housing shaft bore configured to receive the rotor shaft, an annular inner seal member configured to be disposed in the seal member bore, an annular outer seal member configured to be disposed in the seal member bore, an annular middle element disposed entirely between the inner seal member and the outer seal member within the seal member bore, and an end plate having an end plate shaft bore, wherein the end plate is attached to the seal housing and covers a portion of the seal member bore, the end plate shaft bore configured to receive the rotor shaft, wherein the middle element biases the inner seal member against the seal housing and biases the outer seal member against the end plate, and wherein the annular inner seal member, the annular outer seal member, and the annular middle element are disposed within the seal housing in a manner so as to be substantially non-rotatable relative to the rotor shaft during rotation of the rotor shaft.

13. The continuous mixer of claim 12, wherein the seal housing includes at least one fluid port in communication with the seal member bore, the fluid port providing a fluid passage into the seal member bore; and wherein the inner seal member includes a shaft surface disposed proximate an exterior radial surface of the rotor shaft, and the outer seal member includes a shaft surface disposed proximate the exterior radial surface of the rotor shaft; and wherein the shaft seal assembly is configured to include a fluid path that allows a purge fluid entering the fluid port of the shaft seal assembly to exit the shaft seal assembly between the exterior radial surface of the rotor shaft and the shaft surface of at least one of the seal members.

14. The continuous mixer of claim 12, wherein the inner seal member includes at least one lip seal for engagement with the rotor shaft.

15. The continuous mixer of claim 12, further comprising at least one first anti-rotation member operable to prevent rotation of the inner seal member, and at least one second anti-rotation member operable to prevent rotation of the outer seal member.

16. The continuous mixer of claim 15, wherein the inner seal member includes a bore surface having a bore surface cavity, the bore surface cavity having a radial dimension, and the first anti-rotation member extends out from the seal housing and into the bore surface cavity;

wherein the first anti-rotation member has a radial dimension, and the first ant-rotation member radial dimension is less than the bore surface cavity radial dimension.

17. The continuous mixer of claim 16, wherein the outer seal member includes an end plate surface having an end plate surface cavity, the end plate surface cavity having a radial dimension, and the second anti-rotation member extends out from the end plate and into the end plate surface cavity;

wherein the second anti-rotation member has a radial dimension, and the second anti-rotation member radial dimension is less than the end plate surface cavity radial dimension.

18. A compact processor, comprising:
a frame;

a continuous mixer including a housing, at least one rotor shaft operable to be rotated about an axis of rotation within the housing, and at least one shaft seal assembly for sealing along the rotor shaft, the shaft seal assembly including a seal housing having an interior surface, an exterior surface, an outer radial surface, a seal member bore, and a seal housing shaft bore, the seal housing shaft bore configured to receive the rotor shaft, an annular inner seal member configured to be disposed in the seal member bore, an annular outer seal member configured to be disposed in the seal member bore, an annular middle element disposed between the inner seal member and the outer seal member within the seal member bore, and an end plate having an end plate shaft bore, wherein the end plate is attached to the seal housing and covers a portion of the seal member bore, the end plate shaft bore configured to receive the rotor shaft, wherein the middle element biases the inner seal member against the seal housing and biases the outer seal member against the end plate, and wherein the annular inner seal member, the annular outer seal member, and the annular middle element are disposed within the seal housing in a manner so as to be substantially non-rotatable relative to the rotor shaft during rotation of the rotor shaft;

an extruder; and an extruder hopper chute extending between the continuous mixer and the extruder.

19. The shaft seal assembly according to claim 1, wherein the annular inner seal member and the annular outer seal member are not in contact with one another.

20. The shaft seal assembly according to claim 1, wherein the middle element axially biases the inner seal member against the seal housing and biases the outer seal member against the end plate, but does not substantially impede radial movement of either the inner seal member or the outer seal member.

21. The shaft seal assembly according to claim 1, wherein the middle element is disposed entirely between the inner seal member and the outer seal member within the seal member bore.

* * * * *

UNITED STATES PATENT AND TRADEMARK OFFICE
CERTIFICATE OF CORRECTION

PATENT NO. : 9,709,172 B2
APPLICATION NO. : 14/094298
DATED : July 18, 2017
INVENTOR(S) : Stuart Sardinskas and Matthew Bonito It is certified that error appears in the above-identified patent and that said Letters Patent is hereby corrected as shown below:

Column 10
Line 51, please delete "is"
Line 59, please delete "a"

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*